(No Model.)
R. N. &. J. C. CHAMBERLAIN.
CONNECTING DEVICE FOR BATTERY TERMINALS.
No. 423,310. Patented Mar. 11, 1890.
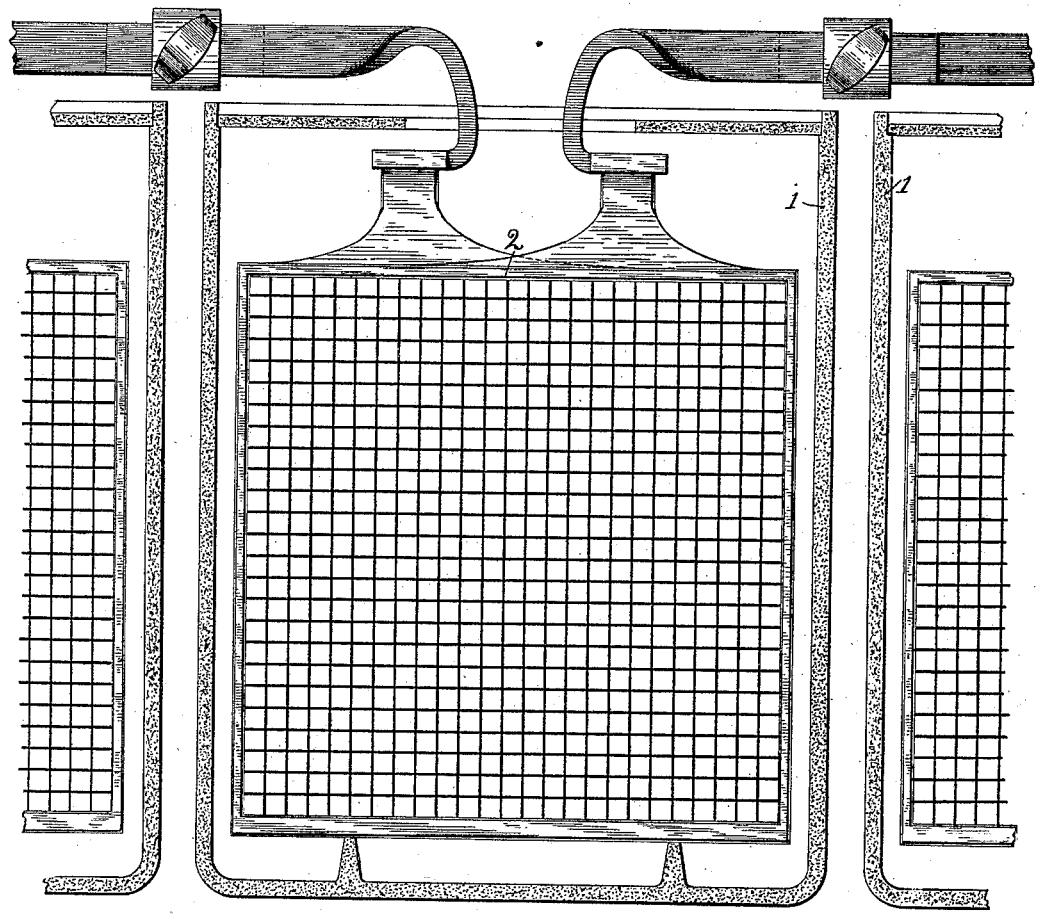
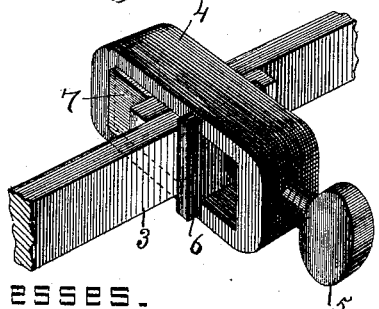
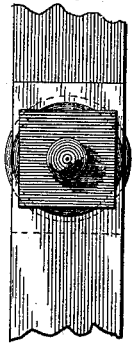
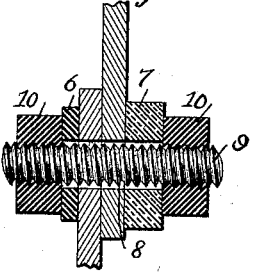
Witnesses.
John F. Nelson
Lillie Hanna
Inventors
J. C. Chamberlain
R. N. Chamberlain
By Knight Bros
attys.

UNITED STATES PATENT OFFICE.

RUFUS N. CHAMBERLAIN AND JACOB C. CHAMBERLAIN, OF NEW YORK, N. Y.

CONNECTING DEVICE FOR BATTERY-TERMINALS.

SPECIFICATION forming part of Letters Patent No. 423,310, dated March 11, 1890.

Application filed November 12, 1889. Serial No. 330,022. (No model.)

*To all whom it may concern:*

Be it known that we, RUFUS N. CHAMBERLAIN and JACOB CHESTER CHAMBERLAIN, both citizens of the United States, residing in the city, county, and State of New York, have jointly invented certain new and useful Improvements in Binding or Connecting Devices for Battery-Terminals, of which the following is a specification.

Ordinarily the terminals of electric batteries are joined or connected together by a metallic clamp, which, when moistened by the electrolytic fluid of a battery, becomes, in connection with the terminals themselves, a local battery or element, with consequent corroding or oxidizing action at the contact points or surfaces of the terminals and clamp, which rapidly impairs and frequently entirely destroys the circuit through the connection. Another difficulty with such metallic connectors when they are employed to bind together the customary lead terminals of secondary batteries is that owing to the peculiar compressibility of lead and its alloys the bearing of the contact-surfaces of the terminals on each other is relieved in the course of time, with the consequent impairing of the circuit through the terminal contacts at this point and the danger of accidental pulling apart of the terminals, or, if such actual rupture does not occur, of great heating at the contact-surfaces by reason of insufficient conductivity due to increased resistance and the formation of an arc which speedily destroys the connection. Still another difficulty arises from the liability of the customary metallic binding-screw to turn back in the nut, and to thus loosen the contacts. To obviate these difficulties, we have devised a form of binding device, clamp, or connector, which, while not susceptible to change by the action of the electrolytic fluid, maintains a constant pressure of the contact-surfaces of the terminals upon each other, and so prevents that slight loosening of the contact which might impair the circuit due to the gradual compression of the lead or its alloys under the action of the clamp.

The invention will be first fully described with reference to the accompanying drawings, and the novel features will then be specified in the claims.

In said drawings, Figure 1 is a sectional view of three battery-cells, with electrodes or plates therein in side elevation, parts of two of the cells being broken away. Fig. 2 is a perspective view of the binding device or connector in its preferred form. Fig. 3 is a side view of a modified form thereof, and Fig. 4 is a sectional view of such modification.

The battery-cells 1 and their containing plates or electrodes 2 may be of any description. The terminals of the plates are preferably flat bars 3, the ends of which may be twisted into vertical position, as shown in Fig. 1, or may be simply bent over, so as to lie one on top of the other in horizontal plane, as may be preferred. The twisted form shown enables the apparatus to be placed in less space, as the clamp will then lie down close to the cells.

The main parts of the connector or binding device for the terminal bars are a clamp of ebonite or equivalent substance not subject to the corrosive action of acids and a resilient cushion so applied to the clamp as to bind the contact-surfaces of the terminal bars together with a constant pressure.

In the form of the invention shown in Figs. 1 and 2, 4 is an oblong band or ring of ebonite adapted to receive the ends of the bars 3.

5 is a thumb-screw (composed of ebonite, of hard rubber, or equivalent substance) threaded in one end of the band and adapted to press the ends of the bars 3 together through the medium of an ebonite or equivalent washer or follower 6 and against the resilient action of a rubber or equivalent cushion 7. For a connector on a secondary battery it is best to make the cushion of soft rubber, that substance possessing a high degree of elasticity and not being affected by the electrolytic fluid.

In the form of the invention shown in Figs. 3 and 4 the terminal bars are perforated, as shown at 8, to receive an ebonite or equivalent screw 9. Ebonite or equivalent nuts 10 on said screw press a washer 6 and rubber cushion 7 against the outside faces of the terminals and so hold the contact-faces of the latter firmly together. Besides its immunity from attack by electrolytic liquid, an ebonite binding-screw is greatly more reliable than one of metal, because of its strongly tractional or adhesive surface-grip on the ebonite nuts. Such a screw is consequently not liable to slip or work loose, so as to impair or destroy the continuity of the circuit.

It is obvious that the invention is susceptible of many changes wherein different forms of screw or other tightening devices are employed in connection with the resilient cushion. We have thought it sufficient to illustrate the invention by simply representing these two forms.

Having thus described our invention, what we claim as new therein, and desire to secure by Letters Patent, is—

1. In a connector for battery-terminals, the combination of a hard-rubber or equivalent band and a hard-rubber or equivalent screw adapted to embrace and clamp the battery-terminals, substantially as set forth.

2. In a connector for battery-terminals, the combination of a clamp and a resilient cushion adapted to receive and press together the battery-terminals, substantially as set forth.

3. In a connector for secondary or other batteries, the combination of a clamp and a resilient cushion of soft rubber arranged to operate in connection therewith, substantially as set forth.

4. In combination with the flat terminal bars of a battery, a clamping or connecting device consisting of a band and screw of hard rubber, a resilient cushion within said band at one end, and a washer or follower to receive the pressure of said screw at the other end, substantially as set forth.

R. N. CHAMBERLAIN.
J. C. CHAMBERLAIN.

Witnesses:
HARRY E. KNIGHT,
MAZIE V. BIDGOOD.